US011356056B1

(12) United States Patent
Li et al.

(10) Patent No.: US 11,356,056 B1
(45) Date of Patent: Jun. 7, 2022

(54) PHOTOVOLTAIC MOBILE LAB

(71) Applicant: INDUSTRIAL TECHNOLOGY RESEARCH INSTITUTE, Hsinchu (TW)

(72) Inventors: Si-Xian Li, Taipei (TW); Teng-Chun Wu, Kinmen County (TW); Cho-Fan Hsieh, Yilan County (TW); Chin Lien, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/132,386

(22) Filed: Dec. 23, 2020

(51) Int. Cl.
| | |
|---|---|
| *H01L 31/18* | (2006.01) |
| *H02S 50/15* | (2014.01) |
| *G01R 31/308* | (2006.01) |
| *G01R 31/26* | (2020.01) |
| *B60P 3/14* | (2006.01) |

(52) U.S. Cl.
CPC ............... *H02S 50/15* (2014.12); *B60P 3/14* (2013.01)

(58) Field of Classification Search
None
See application file for complete search history.

(56) References Cited

U.S. PATENT DOCUMENTS 2,635,771 A * 4/1953 Black .................... B60P 1/4421
414/540
3,193,867 A * 7/1965 Daneman ................. E01H 3/02
15/314

2004/0223325 A1 11/2004 Ahrens
2010/0027236 A1 2/2010 Igari
2011/0241719 A1 10/2011 Shr
(Continued)

FOREIGN PATENT DOCUMENTS

| CN | 201240317 Y | 5/2009 |
| CN | 201646529 U | 11/2010 |
| CN | 202144223 U | 2/2012 |

(Continued)

OTHER PUBLICATIONS

Coello et al., "On-site quality control of photovoltaic modules with the PV Mobile Lab Swiss Mobile Flasher Bus" 2013.
Baumgartner et al., "Swiss Mobile Flasher Bus" Sep. 2009.

*Primary Examiner* — Patrick Assouad
*Assistant Examiner* — Haidong Zhang
(74) *Attorney, Agent, or Firm* — Maschoff Brennan (57) ABSTRACT

The disclosed embodiments relate to a photovoltaic mobile lab configured for performing on-site test in a photovoltaic module. The photovoltaic mobile lab includes a transport vehicle, a first container, a second container, and a light source. The first container is fixed on the transport vehicle. The second container is slidably sleeved on the first container. The second container and the first container together form a testing chamber. The light source is configured for providing illumination to the photovoltaic module. The light source and the photovoltaic module are respectively accommodated in the first container and the second container and are respectively located at two opposite ends of the testing chamber so that a distance between the light source and the photovoltaic module is changeable while the second container is sliding with respect to the first container.

11 Claims, 6 Drawing Sheets

(56) References Cited

U.S. PATENT DOCUMENTS

2012/0075829 A1    3/2012  Li
2020/0099335 A1*   3/2020  Pandey .................. H02S 50/15

FOREIGN PATENT DOCUMENTS

| CN | 105329150 | 2/2016 |
|---|---|---|
| CN | 107748303 A | 3/2018 |
| CN | 207926525 U | 9/2018 |
| CN | 109088581 A | 12/2018 |
| TW | 201914207 A | 4/2019 |
| WO | 2014083212 | 6/2014 |
| WO | 2018/224486 A1 | 12/2018 |

* cited by examiner

PHOTOVOLTAIC MOBILE LAB

TECHNICAL FIELD

The disclosure relates to a mobile lab, more particularly to a photovoltaic mobile lab.

BACKGROUND

To manage on-the-ground controls of photovoltaic (PV) plants, conducting quality testing and inspection of the PV modules are required. For years, the inspections were performed in stationary laboratories. The stationary laboratories shall have an indoor height high enough for the testing distance between the solar simulator and PV module, and have to restrictedly control the indoor temperature, illuminance, and other environmental factors.

In addition, to do the inspection, the PV modules have to be packaged and sent to the laboratory facilities, but the laboratory facilities are generally located far from the PV plants and thus leading to problems associated with transportation, such as the added cost of transportation, long travel time, long down-time due to modules disconnection, and high risk of damages to modules caused by improper handling, vibration, impact, and shock during transportation.

To avoid the above problems, mobile laboratories (also called "PV mobile lab") are developed. A typical PV mobile lab can set up a PV module, light simulator, other relevant equipment on a suitable truck or flatbed trailer, enabling testing the PV modules on-site and thereby avoiding risk of damaging the PV modules during transportation and minimizing the testing times and production down-time. However, in the conventional PV mobile labs, setting up a dark room suitable for inspection and controlling the temperature and humidity of the dark room is very troublesome, and it is also difficult to effectively eliminate unwanted light.

Therefore, some place the light simulator, PV module, and other equipment into the container of the truck to take the container as a dark room. But a single container shall at least have over 6.3 meters long to be able to fit this arrangement because it needs to ensure the desired testing distance between the solar simulator and the PV module. As a result, this type of PV mobile lab will be very big in size, in some countries, holding a specific license is necessary for driving it, in addition, the larger the truck, the higher the maintenance cost and lower mobility when navigating the winding and narrow roads.

SUMMARY

Accordingly, the present disclosure provides a photovoltaic mobile lab that is capable of providing the desired testing distance between the solar simulator and the PV module during inspection and returning to the size of a medium or small vehicle after the inspection, thereby meeting the inspection requirements and achieving mobility. And the solar simulator is stationary so that there is no need to calibrate its optical path before the inspection.

One embodiment of the disclosure provides a photovoltaic mobile lab configured for performing on-site test in a photovoltaic module. The photovoltaic mobile lab includes a transport vehicle, a first container, a second container, and a light source. The first container is fixed on the transport vehicle. The second container is slidably sleeved on the first container. The second container and the first container together form a testing chamber. The light source is configured for providing illumination to the photovoltaic module. The light source and the photovoltaic module are respectively accommodated in the first container and the second container and are respectively located at two opposite ends of the testing chamber so that a distance between the light source and the photovoltaic module is changeable while the second container is sliding with respect to the first container.

According to the photovoltaic mobile lab as discussed in the above embodiments of the disclosure, the first container and the second container together form a telescopically extendable accommodation so that the light source and the photovoltaic module can have a required distance therebetween for inspecting and the whole can be restored to a smaller size when not in use, thereby simultaneously meeting the inspection requirements and achieving mobility.

In addition, the light source is arranged in the first container that is stationary on the transport vehicle, and the photovoltaic module is arranged in the second container that is movable with respect to the first container, that is, the inspection of the photovoltaic module has no need to move the light source. As such, the optical path of the light source is fixed and therefore has no need to be calibrated for every time inspection. Also, the light source is accommodated inside the first container, thus the effects of the external moisture, dust, temperature, or natural sunlight are minimized, such that it is more convenient and easy to maintain the light source.

In contrast, if the light source and the photovoltaic module are switched places, the positioning deviation of the light source will increase with the repeated use of the second container, making the inspection result inaccurate and resulting in calibrations of the optical path for every time uses. As a result, the whole process becomes troublesome and unreliable. In addition, in such a case, the light source will be moved outwards with the second container and therefore will be moved to a position easily exposed to the external moisture and dust. And the dehumidifier has to be arranged to the second container and thus increasing the load on the second container and increasing the positioning deviation. As discussed, the inverted arrangement of the light source and the photovoltaic module will lead to disadvantages, such as positioning deviation of the optical path, an increase of maintenance cost, and inconvenience use.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

The following embodiments will be described with reference to the drawings. For the purpose of clear illustration, some conventional elements and components may be illustrated in a simple and clear manner. Some of the features in the drawings may be slightly exaggerated or illustrated in a larger proportion for the ease of viewing but are not intended to limit the disclosure. In addition, for the same reason, some of the elements or components in the drawings may be illustrated in dotted lines.

Herein, the terms, such as "end", "part", "portion", "area", may be used to refer to specific features of or between elements or components but are not intended to limit the elements and components. In addition, the terms, such as "substantially" and "approximately", as used herein may mean a reasonable amount of deviation of the described term such that the end result is not significantly changed.

Further, unless explicitly stated, the term "at least one" as used herein may mean that the quantity of the described element or component is one or larger than one but does not necessarily mean that the quantity is only one. The term "and/or" may be used herein to indicate that either or both of two stated possibilities.

Figure 1:
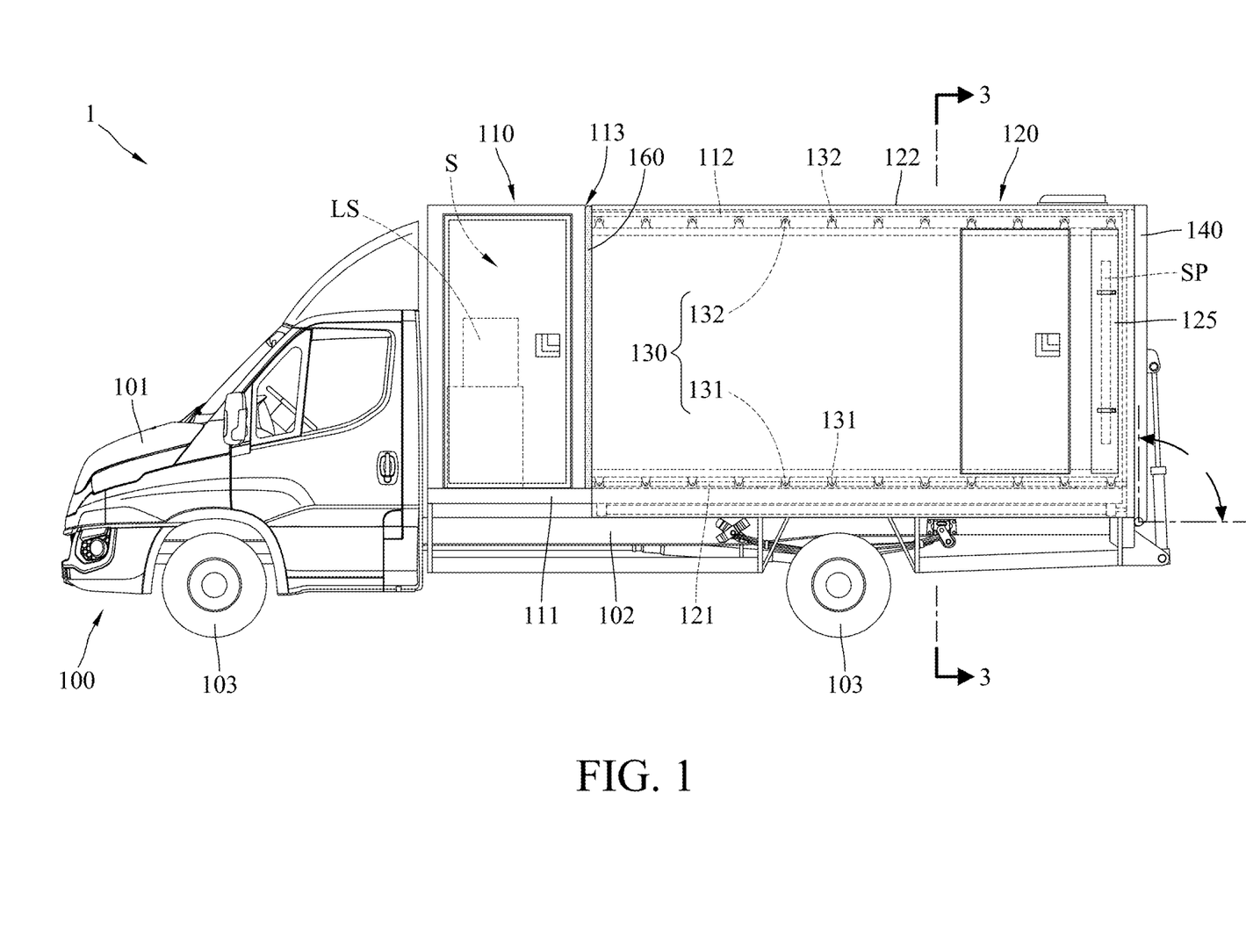
FIGS. 1-2 illustrate side views of a photovoltaic mobile lab according to one embodiment of the disclosure when the photovoltaic mobile lab is in a retracted state.
Figure 2:
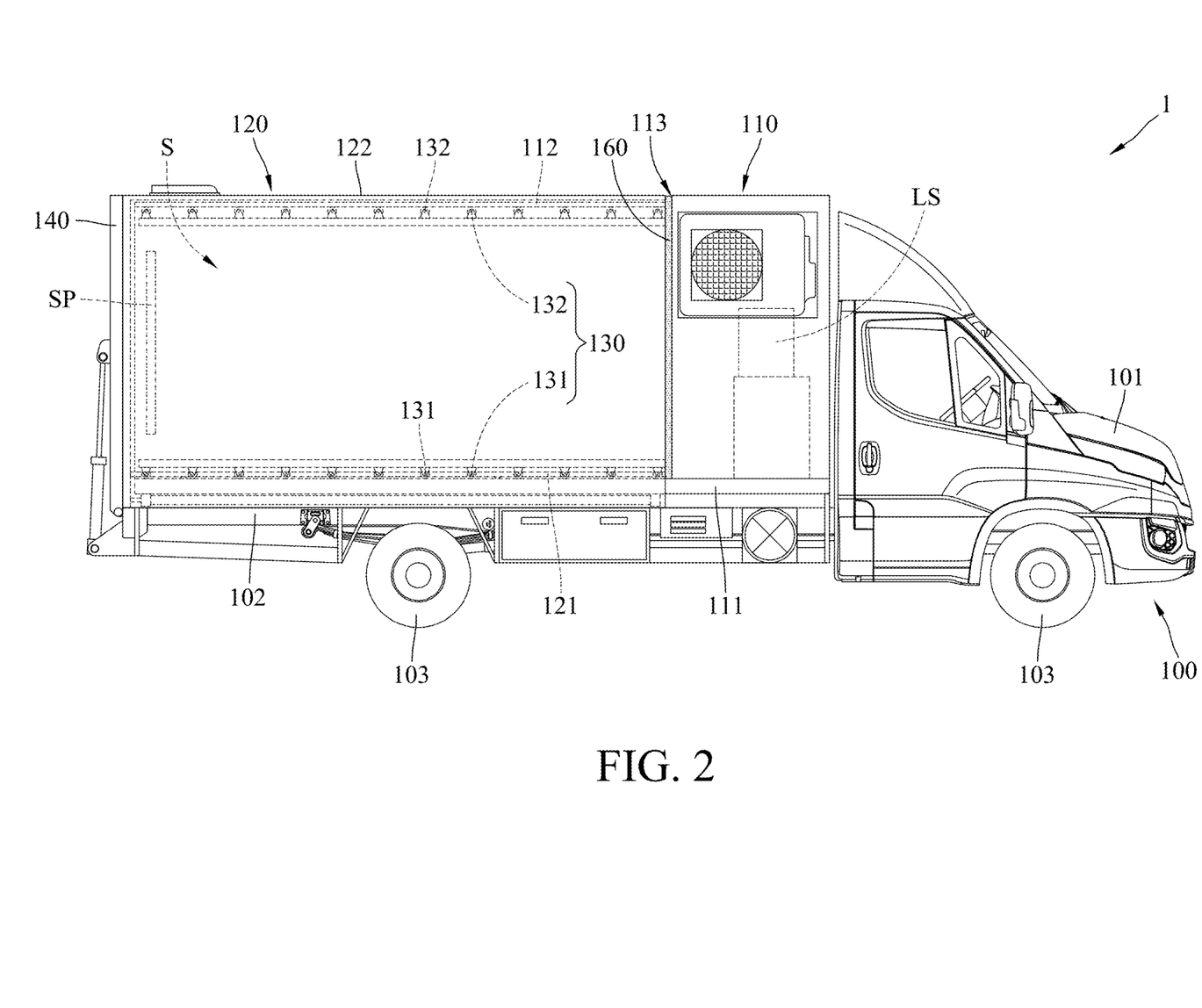
Figure 3:
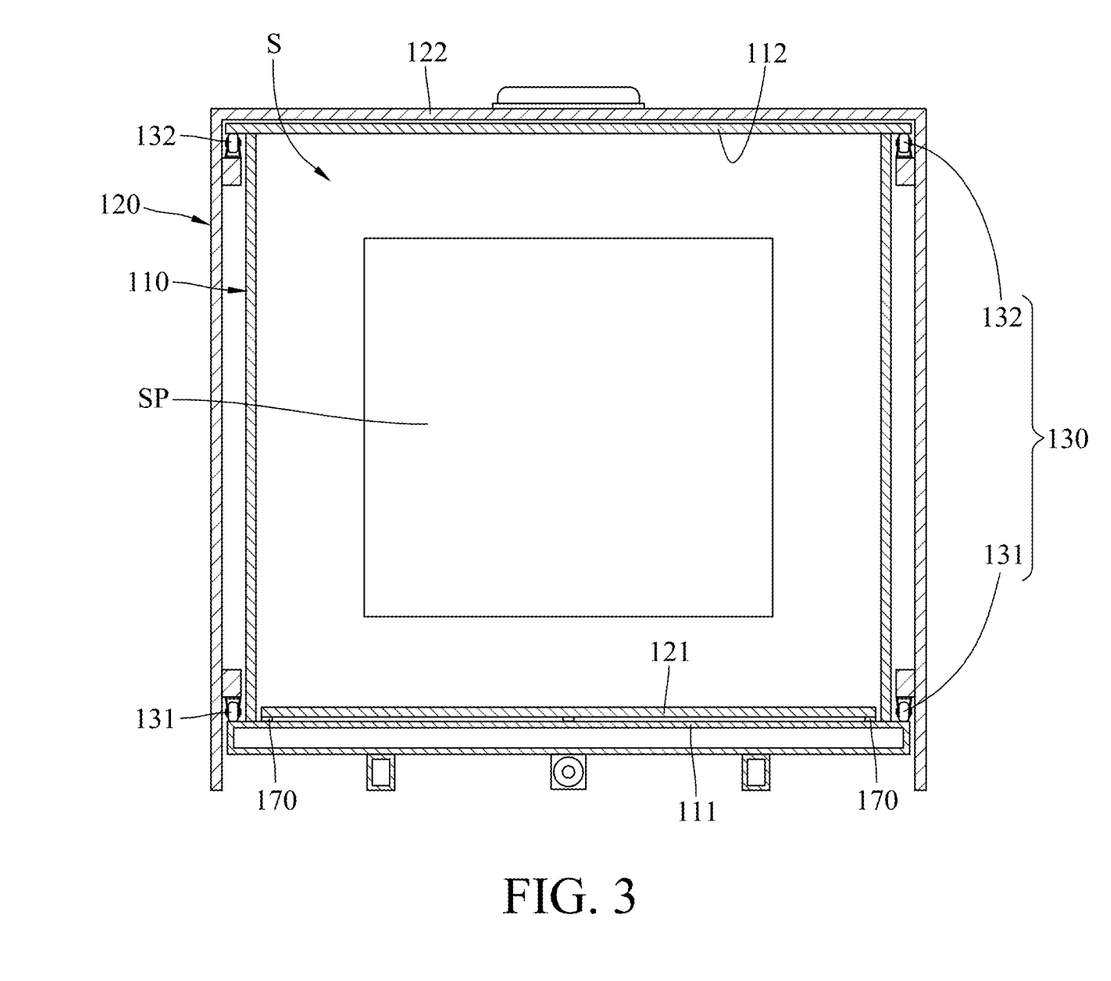
FIG. 3 illustrates a cross-sectional view of the photovoltaic mobile lab in FIG. 1 taken along line 3-3'.

Firstly, referring to FIGS. 1-3, one embodiment of the disclosure provides a photovoltaic mobile lab 1 (also called "PV mobile lab" or "mobile PV-testing center"). Note that the photovoltaic mobile lab 1 shown in the drawings may be simplified or partially omitted for the purpose of clear explanation. The photovoltaic mobile lab 1 is, but not limited to, in the form of truck, flatbed trailer, or another suitable vehicle, therefore is capable of performing on-site test in photovoltaic modules (also called "PV module"). Thus, the problems associated with transportation of PV modules are prevented, such as the long travel time, the added cost of transportation, and long production down-time due to PV modules disconnection, and high risk of damages to PV modules caused by improper handling, vibration, impact, and shock during transportation.

The photovoltaic mobile lab 1 is designed to perform the following tests: visual inspection, peak power determination in standard test condition (STC), electrical insulation, IR thermography, and electroluminescence (EL) imaging, but the testing items can be modified as required but are not intended to limit the disclosure.

Figure 4:
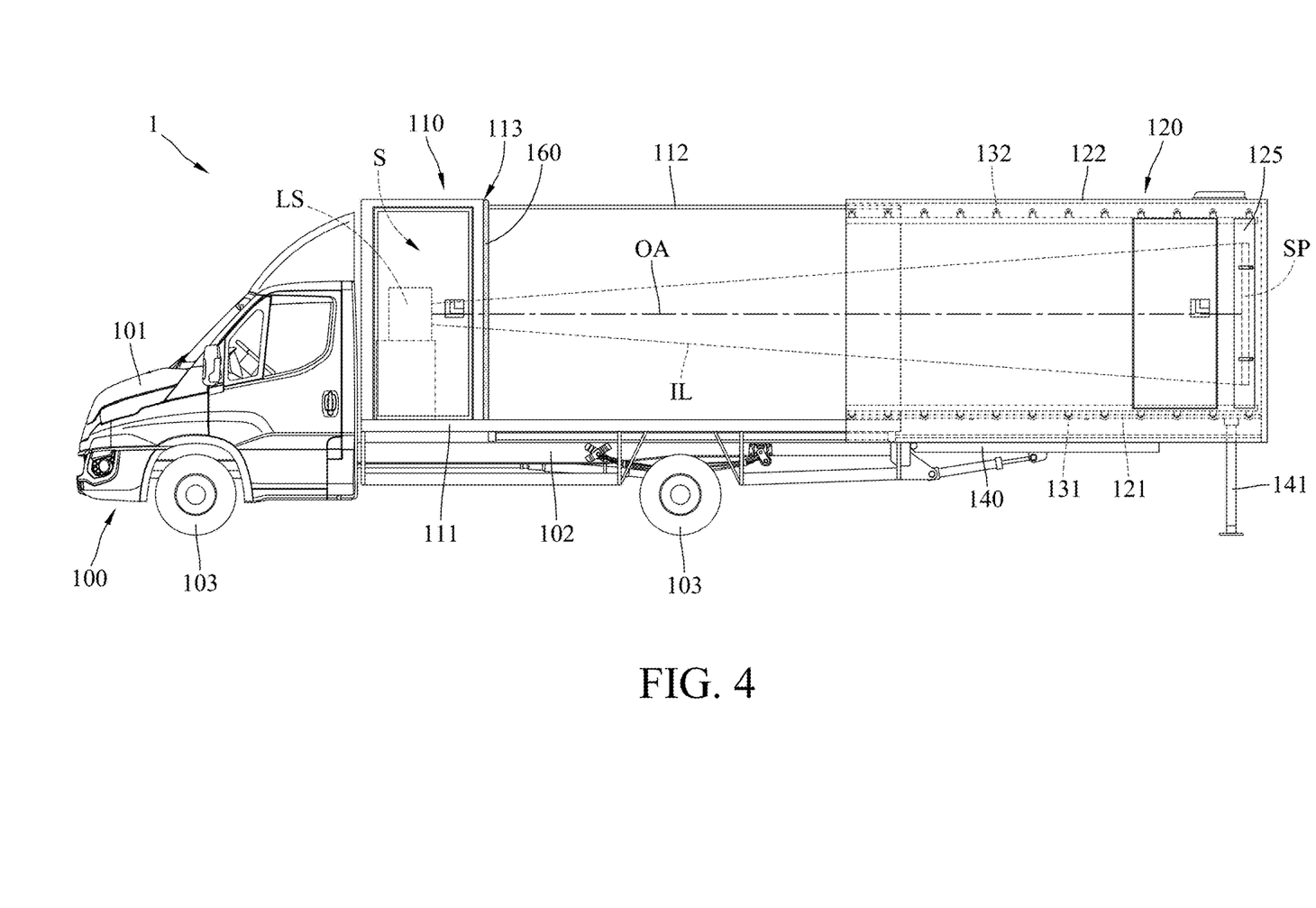
FIGS. 4-5 illustrate side views showing the use of the photovoltaic mobile lab in FIG. 1 as the photovoltaic mobile lab is switched to an extended state.
Figure 5:
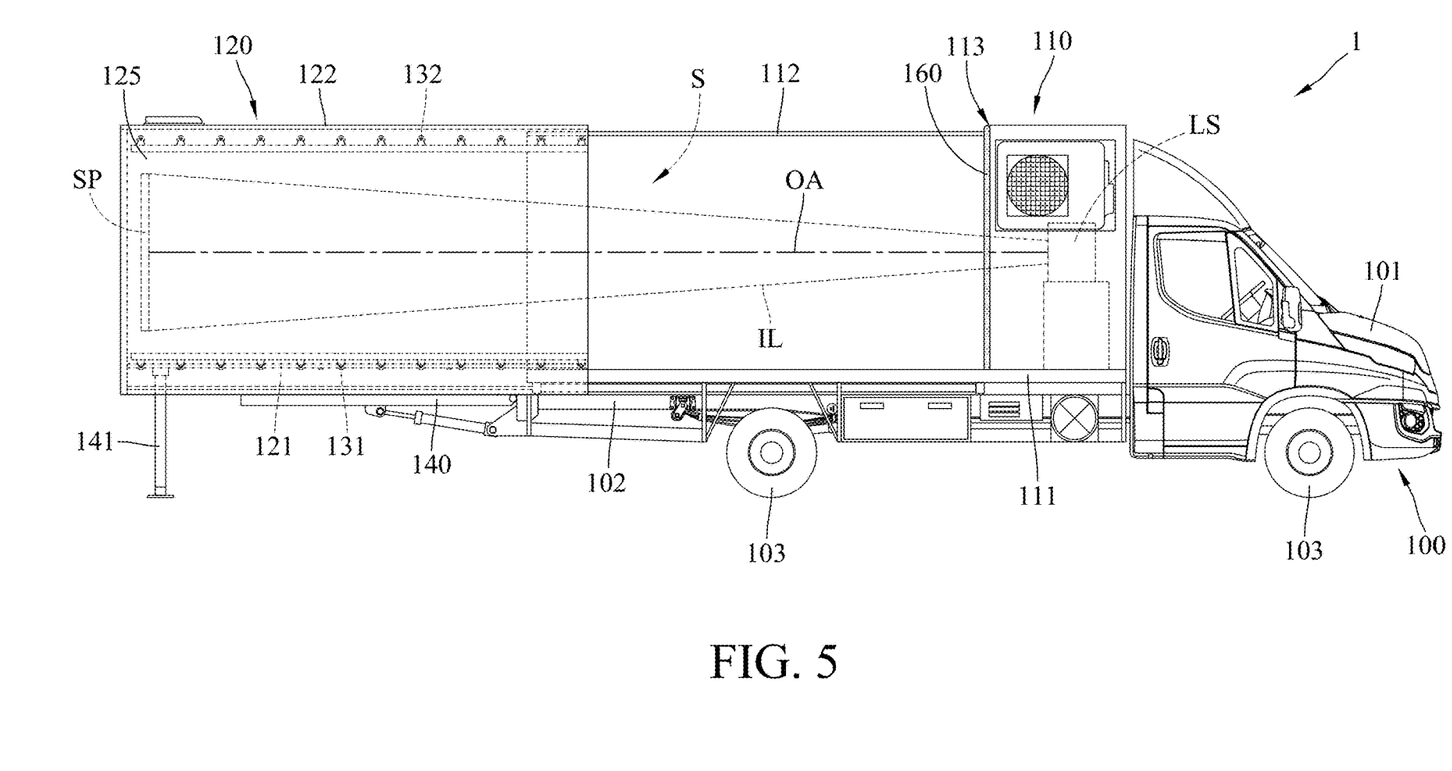

Please further refer to FIGS. 4-5, in this embodiment, the photovoltaic mobile lab 1 may at least include a transport vehicle 100, a first container 110, a second container 120, and at least one light source LS. In this embodiment that the photovoltaic mobile lab 1 is in the form of truck, the transport vehicle 100 is the main body or a tractor unit of a truck, which may include a head portion 101 and a carrier portion 102 connected to the head portion 101, where the carrier portion 102 is equipped with wheel portions 103 and other components (not numbered) associated with driving the transport vehicle 100.

The first container 110 and the second container 120 are both supported by the carrier portion 102. The second container 120 is movably sleeved on the first container 110 so that the first container 110 and the second container 120 together form a telescopically extendable accommodation. As shown, the first container 110 is an internal section of the telescopically extendable accommodation, and the second container 120 is an external section of the telescopically extendable accommodation. In this configuration, the photovoltaic mobile lab 1 is switchable between a retracted state (as shown in FIGS. 1-2) and an extended state (as shown in FIGS. 4-5).

Further, in this embodiment, the first container 110 is immovably fixed on the carrier portion 102, thus the first container 110 is stationary respect to the transport vehicle 100. As shown, a first bottom plate 111 of the first container 110 can be stacked on the carrier portion 102 via any suitable manner; alternatively, the first bottom plate 111 of the first container 110 can be integrally formed with the carrier portion 102 and therefore can be considered as a part of the carrier portion 120.

The light source LS is accommodated in the first container 110 and fixed to the first container 110. As shown, the light source LS is arranged at the part of the first container 110 located closer to the head portion 101, thus, the light source LS is immovable with respect to the transport vehicle 100 via the first container 110. The light source LS is, but not limited to, any suitable solar simulator that can provide illumination approximating natural sunlight. The purpose of the solar simulator is to provide a controllable indoor test facility under laboratory conditions, and its specification can be determined according to the physical characteristics required for testing, such as radiation intensity and radiation distribution and is not of limitation.

The second container 120 is slidably arranged on the first container 110. In other words, the second container 120 is movable with respect to the transport vehicle 100 via the first container 110. As such, the first container 110 and the second container 120 together constitute a laboratory cabin in the form of an extensible box, having a testing chamber S having a changeable volume. In addition, to assist the second container 120 in sliding along the first container 110, in this embodiment, the photovoltaic mobile lab 1 may include at least one roller set 130. As shown, the second container 120 is slidably disposed on the first container 110 via the roller set 130. In specific, the roller set 130 may at least include a first roller set 131 and a second roller set 132, when the second container 120 is sleeved on the first container 110, two sides of its second bottom plate 121 can be slidably stacked on the first container 110 via the first roller set 131, and two sides of its second top plate 122 can be slidably stacked on or above a first top plate 112 of the first container 110 via the second roller set 132. In such an arrangement, the second container 120 is slidable with respect to the transport vehicle 100, the first container 110, and the light source LS in the first container 110 through the first roller set 131 and the second roller set 132. In this embodiment, when the second container 120 is sleeved on the first container 110, the second bottom plate 121 extends into the first container 110 and is stacked on or above the first bottom plate 111; in specific, the second bottom plate 121 is a plate-shaped structure extending from a rear plate (not numbered) of the second container 120 and suspended between the side plates (not numbered) of the second container 120.

Thus, as shown in FIGS. 1-2, the second container 120 can be retracted towards the first container 110 so that the photovoltaic mobile lab 1 is switched to a retracted state of a relatively shorter overall length, or, as shown in FIGS. 4-5, the second container 120 can be extended outward from the first container 110 so that the photovoltaic mobile lab 1 is switched to an extended state of a relatively longer overall length.

Herein, to further reduce the friction force between the second container 120 and the first container 110, there are a plurality of rails 170 (as shown in FIG. 3) protruding outward from the surface of the second bottom plate 121 of the second container 120 facing the first bottom plate 111 of the first container 110. The rail 170 is, but not limited by, an elongated shape arranged between and clamped by the second bottom plate 121 and the first bottom plate 111, such that the second bottom plate 121 is spaced apart from the first bottom plate 111 and therefore the friction caused by the motion of the second bottom plate 121 with respect to the first bottom plate 111 is minimized. Similarly, in some other embodiments, the rails 170 can be applied to the surface of the second top plate 122 of the second container 120 facing the first top plate 112 of the second top plate 122 to reduce the friction between the second top plate 122 and the first top plate 112.

In this embodiment, the photovoltaic mobile lab 1 is configured to accommodate at least one photovoltaic module to be tested. As shown, a photovoltaic module SP is accommodated in the second container 120. The photovoltaic module SP is, but not limited to, a typical PV module can be seen in PV plants and not intended to limit the disclosure. The photovoltaic module SP can be arranged to a place on the second container 120 that is relatively away from the light source LS, such that the light source LS and the photovoltaic module SP are respectively arranged at two opposite ends of the telescopically extendable accommodation formed of the first container 110 and the second container 120. In other words, the light source LS and the photovoltaic module SP are respectively arranged at two opposite ends of the testing chamber S.

As discussed, the cooperation of the first container 110 and the second container 120 ensures that the photovoltaic mobile lab 1 can be switched to the extended state to keep the light source LS at a required distance to the photovoltaic module SP during testing while ensuring the photovoltaic mobile lab 1 can be retracted to the retracted state to obtain a smaller size when not in use, thereby simultaneously meeting the inspection requirements and achieving mobility.

In practical applications, the photovoltaic mobile lab 1 can provide the light source LS and the photovoltaic module SP with a testing chamber S of a sufficient volume while be able to be retracted and sized to a level that has a loose requirement for driving license. And the photovoltaic mobile lab 1 in the retracted state is easy to be maintained and better for navigating the winding and narrow roads.

To ensure the accuracy of the testing and inspection, the assembly of the first container 110 and the second container 120 has to make the testing chamber S reach the level required for being a dark room, thus the gaps between the second container 120 and the first container 110 must be reduced to a level that does not allow external light to enter the testing chamber S. In other words, the testing chamber S formed by the first container 110 and the second container 120 can be completely dark and therefore is suitable for various testing on the photovoltaic module SP.

In addition, to further improve the testing accuracy, the photovoltaic module to be tested and the solar simulator (i.e., the light source LS) are both placed in a temperature and humidity controllable environment, meanwhile, a heat dissipation means is also provided for dissipating the heat generated by the solar simulator. Thus, the placement of the light source LS not only considers the place of the photovoltaic module SP but also considers the places of the heat dissipator, fan, air conditioner, and other equipment associated with testing. For the above reasons, the photovoltaic mobile lab 1 places the light source LS in the first container 110, such that the heat dissipator, fan, air conditioner, and other equipment that are heavy in weight and need to be cooperated with the light source LS are arranged on the first container 110 and/or the carrier portion 102, such that most of the loads are on the carrier portion 102. In addition, the light source LS is arranged in the deepest end of the first container 110, which not only can obtain a better dark room but also can help reduce the effect from the external environment (e.g., the external moisture, dust, or ambient temperature) and facilitate the maintenance.

As such, due to the arrangement that the light source LS is arranged in the first container 110 and the photovoltaic module SP is arranged in the second container 120, the testing will not involve moving the light source LS. Instead, it only needs to extend the second container 120 outwards to start the testing, and the equipment associated with testing are loading on the first container 110 and/or the carrier portion 102, such that the second container 120 only needs to support the photovoltaic module SP. As a result, the weight loaded the second container 120 is relatively small, thus the optical axis OA of the light source LS does not have positioning deviation overtime and after repeated uses, such that an incident light IL of the light source LS (as shown in FIGS. 4-5) is always in the predetermined path towards the photovoltaic module SP. Thus, the photovoltaic mobile lab 1 can perform required testing directly without calibration of optical path for every time uses.

The above advantages can be reflected by comparing with an inverted arrangement. In specific, if the light source LS and the photovoltaic module SP are switched places, (i.e., the light source LS is moved to the second container 120, and the photovoltaic module SP is moved to the first container 110), the light source LS that is heavy in weight will be loaded on the second container 120. In such a case, the torque generated by the light source LS at the end of the second container 120 to the first container 110 will largely increase during the extended state, increasing the probability of positioning deviation of the second container 120, not to mention that the heat dissipator and the fan that are cooperated with the light source LS will be moved to the second container 120 as well and thus further increasing the burden on the second container 120 and the positioning deviation of the second container 120. Besides, the light source LS is arranged at the end of the second container 120, thus any slight deviation in position will result in a non-negligible deviation of the optical axis. For example, in the inverted arrangement, assuming the distance between the light source LS and the photovoltaic module SP is 550 centimeters during the extended state, even if the light source LS only produces a deviation of 1 degree to the optical axis OA, the incident light IL to the photovoltaic module SP will still lead to a deviation of about 9.6 centimeters to seriously affect the testing accuracy.

That is, in the inverted arrangement that the photovoltaic module SP is arranged at the immovable component (i.e., the first container 110) but the light source LS is arranged at the movable component (i.e., the second container 120), the second container 120 is easy to deform or have positioning deviation due to load thereon, causing the optical path of the light source LS to deviate from the predetermined path or magnifying the positioning deviation of the light source LS, thereby affecting the testing accuracy. With the above problems caused by the inverted arrangement, the user has to calibrate the optical path of the light source LS for every time uses, making the testing process troublesome and unreliable.

Figure 6:
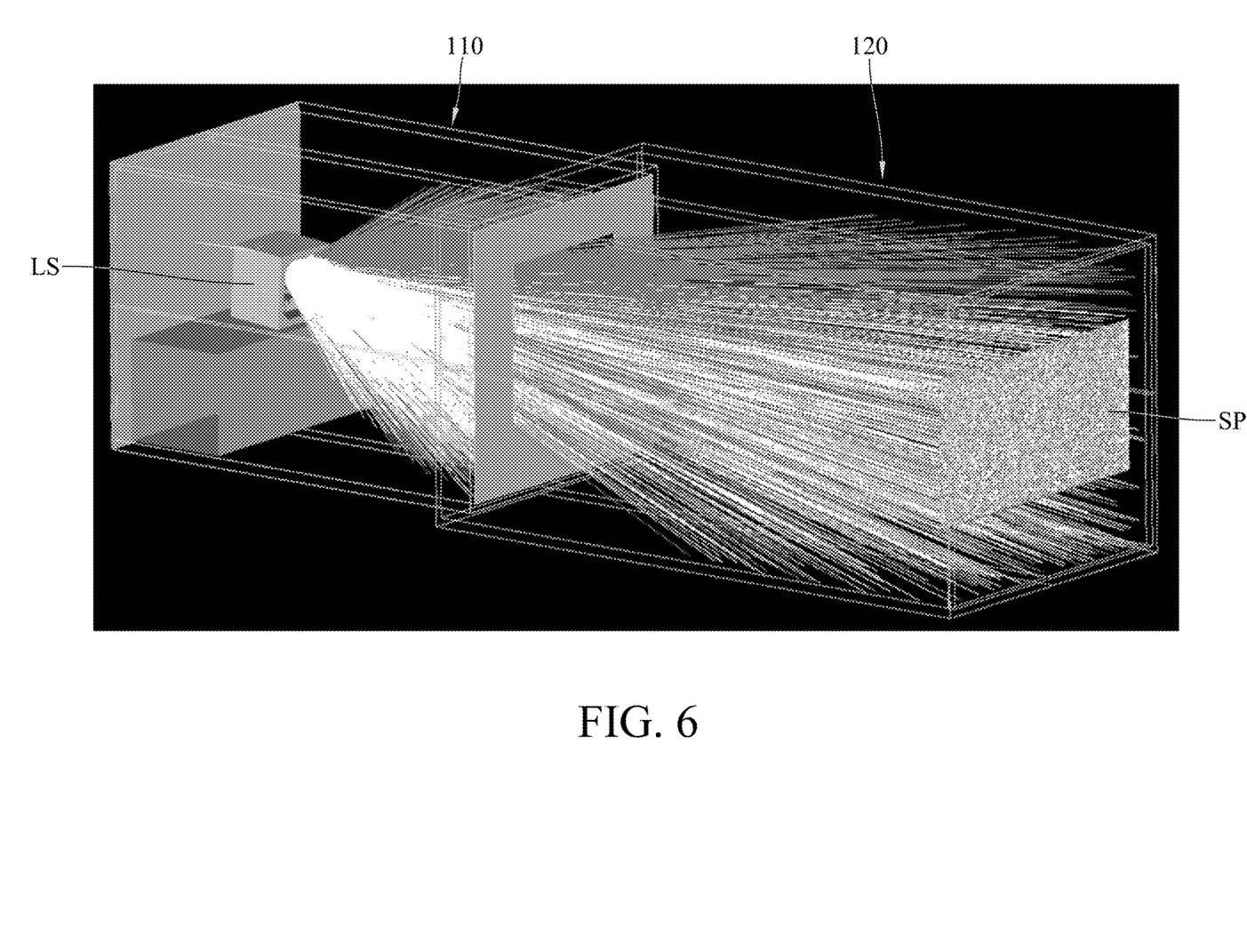
FIG. 6 depicts an optical path simulation of one embodiment according to the disclosure.

Then, referring to FIG. 6, an optical path simulation of the photovoltaic mobile lab 1 is provided.

This can be used for better understanding the feasibility of the light source LS in the photovoltaic mobile lab 1. As shown, the light source LS can evenly project light to the photovoltaic module SP, according to the simulation results, the photovoltaic mobile lab 1 can make the light source LS reach the level A of the three performance indicators for solar simulator based on the IEC 60904-9, that is, the light source LS in the photovoltaic mobile lab 1 can achieve the spectral conformity ranging between 0.75 and 1.25, unevenness of light illumination less than 2%, and the instability of light illumination less than 2%.

Moreover, to further stable the second container 120, in this embodiment, the photovoltaic mobile lab 1 may include a supporting plate 140, the supporting plate 140 is pivotably disposed at the end of the first bottom plate 111 of the first container 110 located away from the light source LS or is pivotably disposed at the end of the carrier portion 102 located away from the light source LS. The supporting plate 140 can be driven by a hydraulic cylinder (not numbered) or other suitable means and is not intended to limit the disclosure. As shown in FIGS. 1-2, during the retracted state, the supporting plate 140 is able to cover the rear surface (not numbered) of the second container 120. As shown in FIGS. 4-5, the supporting plate 140 can be folded down to a horizontal position during the extended state for supporting the extending part of the second container 120. Thus, the supporting plate 140 is configured to support the part of the second container 120 that does not yet overlap with the first container 110 (i.e., the part of the second container 120 is not yet stacked on the first container 110). With this, the supporting plate 140 can not only improve the stability of the second container 120, but also can help prevent the second container 120 from positioning deviation, thereby improving the reliability of the photovoltaic mobile lab 1.

In addition, a controller (not shown) can be provided on the photovoltaic mobile lab 1 to adjust the angle of the supporting plate 140. Thus, even if the second container 120 was deviated from track due to unexpected reason, the supporting plate 140 can be rotated to a position desired for pushing the second container 120 back to its original position.

Further, in this embodiment, the photovoltaic mobile lab 1 may include at least one supporting post 141, as shown in FIGS. 4-5, the supporting post 141 is movably disposed under the second bottom plate 121 of the second container 120. The supporting post 141 can be switched to a vertical position to support the part of the second container 120 protruding outwards above the ground, increasing the stability of the second container 120 during the extended state.

Note that the supporting plate 140 and the supporting post 141 are optional; in some other embodiments, the photovoltaic mobile lab may omit the aforementioned supporting plate 140 and the supporting post 141.

In addition, to increase the sealness, in some embodiments, the first container 110 may have a step 113. In specific, the step 113 extends along the side plates (not numbered) and the first top plate 112 of the first container 110, the depth of the step 113 is substantially smaller, equal, or larger than the plate thickness of the part of the second container 120 is sleeved on the first container 110, and the thickness of the second top plate 122 of the second container 120 may be smaller, equal, or larger than the depth of the step 113. As shown, when the second top plate 122 is stacked on the first top plate 112 of the first container 110, the second top plate 122 may press against the vertical surface (not numbered) of the step 113 on the first top plate 112, such that the gap between the overlapping parts of the second top plate 122 and the first top plate 112 is not directly exposed, preventing water and dust from entering. In this embodiment, the depth of the step 113 is substantially equal to the plate thickness of the second container 120, thus the part of the first top plate 112 of the first container 110 not covered by the second top plate 122 of the second container 120 is substantially flush with the second top plate 122.

Furthermore, in some other embodiments, a rubber stripe 160 can be arranged along the step 113. The rubber stripe 160 is made of, for example, any suitable elastic and waterproof material. The rubber stripe 160 will be clamped by the first container 110 and the second container 120 during the retracted state to further preventing water and dust from entering.

Moreover, in this embodiment, the second container 120 may have at least one door 125 arranged the side of a side plate (not numbered) of the second container 120 located away from the light source LS and is configured for the removal of the photovoltaic module SP from the second container 120 and the placement of the photovoltaic module SP into the second container 120.

Lastly, in this embodiment or other embodiments, the photovoltaic mobile lab 1 can also include other facilities or equipment (not numbered or shown) related to testing or improving convenience. For example, a door for personnel or an overhang are arranged on the first container 110 and/or the second container 120, and a generator for laboratory operation can be provided on the photovoltaic mobile lab 1, but the above additional features are optional and not intended to limit the disclosure.

According to the photovoltaic mobile lab as discussed in the above embodiments of the disclosure, the first container and the second container together form a telescopically extendable accommodation so that the light source and the photovoltaic module can have a required distance therebetween for inspecting and the whole can be restored to a smaller size when not in use, thereby simultaneously meeting the inspection requirements and achieving mobility.

In addition, the light source is arranged in the first container that is stationary on the transport vehicle, and the photovoltaic module is arranged in the second container that is movable with respect to the first container, that is, the inspection of the photovoltaic module has no need to move the light source. As such, the optical path of the light source is fixed and therefore has no need to be calibrated for every time inspection. Also, the light source is accommodated inside the first container, thus the effects of the external moisture, dust, temperature, or natural sunlight are minimized, such that it is more convenient and easy to maintain the light source.

In contrast, if the light source and the photovoltaic module are switched places, the positioning deviation of the light source will increase with the repeated use of the second container, making the inspection result inaccurate and resulting in calibrations of the optical path for every time uses. As a result, the whole process becomes troublesome and unreliable. In addition, in such a case, the light source will be moved outwards with the second container and therefore will be moved to a position easily exposed to the external moisture and dust. And the dehumidifier has to be arranged to the second container and thus increasing the load on the second container and increasing the positioning deviation. As discussed, the inverted arrangement of the light source and the photovoltaic module will lead to disadvantages, such as positioning deviation of the optical path, an increase of maintenance cost, and inconvenience use.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A photovoltaic mobile lab, configured for performing on-site test in a photovoltaic module, the photovoltaic mobile lab comprising:
   a transport vehicle;
   a first container, fixed on the transport vehicle;
   a second container, slidably sleeved on the first container and accommodating at least part of the first container, wherein the second container and the first container together form a testing chamber; and
   a light source, configured for providing illumination to the photovoltaic module, wherein the light source and the photovoltaic module are respectively accommodated in the first container and the second container and are respectively located at two opposite ends of the testing chamber so that a distance between the light source and the photovoltaic module is changeable while the second container is sliding with respect to the first container.

2. The photovoltaic mobile lab according to claim 1, further comprising at least one roller set, wherein the second container is slidably disposed on the first container via the at least one roller set.

3. The photovoltaic mobile lab according to claim 1, wherein the first container includes a first top plate and a first bottom plate located opposite to each other, the second container includes a second top plate and a second bottom plate located opposite to each other, the first top plate is stacked on the second top plate, and the second bottom plate is located in the first container and stacked on the first bottom plate.

4. The photovoltaic mobile lab according to claim 3, further comprising a plurality of rail protruding from a surface of the second bottom plate of the second container facing the first bottom plate of the first container, wherein the plurality of rails are located between and clamped by the second bottom plate and the first bottom plate.

5. The photovoltaic mobile lab according to claim 1, wherein the first container has a step configured for the second container to press against thereto.

6. The photovoltaic mobile lab according to claim 5, further comprising a rubber stripe arranged along the step and configured to be clamped by the first container and the second container.

7. The photovoltaic mobile lab according to claim 1, wherein the second container has a door located at a side of the second container located away from the light source and corresponding to the photovoltaic module within the testing chamber.

8. The photovoltaic mobile lab according to claim 1, further comprising a supporting plate pivotably connected to the transport vehicle and configured for supporting part of the second container not overlapping with the first container.

9. The photovoltaic mobile lab according to claim 1, further comprising at least one supporting post movably connected to the second container and configured for supporting part of the second container not overlapping with the first container above ground.

10. The photovoltaic mobile lab according to claim 1, wherein the light source is immovably fixed to the transport vehicle via the first container.

11. The photovoltaic mobile lab according to claim 1, wherein the testing chamber formed by the first container and the second container is configured to be served as a dark room for electroluminescence test for the photovoltaic module.

* * * * *